United States Patent [19]
Melino et al.

[11] Patent Number: 6,137,522
[45] Date of Patent: Oct. 24, 2000

[54] RASTER OUTPUT SCANNER EXPOSURE CONTROL FOR BIAS AND RUN LEVELS IN A MULTIPLE DIODE SYSTEM

[75] Inventors: Robert H. Melino; Martin E. Hoover, both of Rochester, N.Y.

[73] Assignee: Xerox Corporation, Stamford, Conn.

[21] Appl. No.: 09/004,095

[22] Filed: Jan. 7, 1998

[51] Int. Cl.$^7$ .................................................. B41J 2/455
[52] U.S. Cl. ........................................... 347/233; 347/236
[58] Field of Search .................................. 347/233, 235, 347/236, 237, 238, 246, 247, 130, 135; 372/29, 38, 24; 342/256; 250/227.26; 369/97

[56] References Cited

U.S. PATENT DOCUMENTS

| | | | |
|---|---|---|---|
| Re. 31,969 | 8/1985 | Sell ............................................ | 372/38 |
| 4,928,277 | 5/1990 | Monma et al. .......................... | 369/116 |
| 5,208,796 | 5/1993 | Wong et al. .............................. | 369/97 |
| 5,268,916 | 12/1993 | Slawson et al. .......................... | 372/38 |
| 5,293,263 | 3/1994 | De Rijck .................................. | 372/38 |
| 5,381,165 | 1/1995 | Lofthus et al. .......................... | 347/232 |
| 5,412,677 | 5/1995 | Guerin et al. .............................. | 372/38 |
| 5,438,354 | 8/1995 | Genovese ................................ | 347/256 |
| 5,508,513 | 4/1996 | Genovese ............................ | 250/227.26 |
| 5,889,802 | 3/1999 | Walker ...................................... | 372/38 |
| 5,912,694 | 6/1999 | Miyake .................................... | 347/247 |

*Primary Examiner*—N. Le
*Assistant Examiner*—Lamson D. Nguyen
*Attorney, Agent, or Firm*—Duane Basch; Aditya Krishnan

[57] ABSTRACT

The present invention is a method and apparatus for digitally controlling the output of multiple laser diodes in a system that forms a plurality of scan lines in a Raster Output Scanning (ROS) system. Output of the laser diodes is digitally controlled by monitoring and controlling the bias and run level power for each of the laser diodes. The system employs predetermined, controllable biasing currents to increase the resolution of the exposure current and thereby accurately control the output power of each of the multiple laser diodes, and to provide a fixed exposure level that is detectable by a low-cost start-of-scan detector.

10 Claims, 8 Drawing Sheets

$$I_{LD} = I_{ODC} + I_{DC} + I_{OAC} + I_{AC}$$

RASTER OUTPUT SCANNER EXPOSURE CONTROL FOR BIAS AND RUN LEVELS IN A MULTIPLE DIODE SYSTEM

CROSS REFERENCE

The following related application is hereby incorporated by reference for its teachings:

"TWO POINT POWER CONTROL FOR DUAL LASER DIODES USING MICROPROCESSOR BASED CONTROLLERS," Martin E. Hoover, application No. 08/792,559, filed Jan. 31, 1997. (D/95514)

This invention relates generally to a multiple-diode raster output scanning system for producing high intensity imaging beams directed toward a reflective scanning element to cause the beams to scan across a movable photoresponsive member and record latent electrostatic images thereon, and more particularly, to multi-diode bias and run level power control implemented by a microprocessor to digitally control the power from the multiple laser diodes.

BACKGROUND AND SUMMARY OF THE INVENTION

In recent years, laser printers have been increasingly utilized to produce output copies from input video data representing original image information. The printer typically uses a Raster Output Scanner (ROS) to expose the charged portions of the photoresponsive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet of the polygon and thereafter focused to a "spot" on the photosensitive member. The rotation of the polygon causes the spot to scan across the photoresponsive member in a fast scan (i.e., line scan) direction. Meanwhile, the photoresponsive member is advanced relatively more slowly than the rate of the fast scan in a slow scan (process) direction that is orthogonal to the fast scan direction. In this way, the beam scans the recording medium in a raster (or scan line) scanning pattern. The light beam is intensity-modulated in accordance with an input image data stream at a rate such that individual picture elements ("pixels") of the image represented by the data stream are exposed on the photosensitive medium to form a latent electrostatic image. The latent image is then developed and transferred to an appropriate image receiving medium such as paper.

Heretofore, a number of patents and publications have disclosed laser diode power control techniques, the relevant portions of which may be briefly summarized as follows:

U.S. Pat. No. 5,412,677 to Guerin et al., issued May 2, 1995, discloses a laser diode including a feedback system. The system compares pixel information against output power from a back photodiode to generate a feedback signal used to control current of the laser diode.

A difficulty in the past, is that other prior art techniques in power control of laser diodes have focused on thermo-electric (TE) coolers that regulate the temperature of the laser to minimize the power variation due to temperature. These (TE) coolers are expensive, bulky in size, and very inefficient to operate. More recent methods employ analog power controls which become increasingly difficult to implement when controlling the newest technology lasers with multiple diodes located within the same package. When using a multiple laser diode for simultaneous imaging, it is very important to balance the power of the beams to provide uniform exposure. This problem is exacerbated by the presence of thermal crosstalk between the plurality of diodes that may be placed within a common package. In addition, in prior art machines, exposure control has often been set by a "control knob" implemented with analog signal wires sensitive to noise.

Thus it would be desirable to provide a power system control that overcomes many of these difficulties in the prior art. It is therefore an object of the present invention to overcome not only changing characteristics due to temperature, but also differences between dual lasers in providing the necessary power balance. It is another object of the present invention to provide a microprocessor based digital control with embedded intelligence and diagnostic capability in controlling laser power. Another object of the present invention is to vary exposure setpoints by serial download of digital information including functional parameter data such as control loop compensation data. Other advantages of the present invention will become apparent as the following description proceeds, and the features characterizing the invention will be pointed out with particularity in the claims annexed to and forming a part of this specification.

This invention is a power control method implemented by a microprocessor to digitally control the power from a multiple (preferably dual) laser diode within a Raster Output Scanner sub-system. The exposure power of each of two lasers is controlled for both the video ON exposure (Level) and the video OFF background (Bias) In particular, two different points on the laser diode characteristic curve are measured and each laser is controlled with two control loops, one for Bias and one for Level. The Bias control is done by indirect sensing method which also enables constant exposure power during Start Of Scan (SOS) detection. The Level control regulates the ON power for each of two beams to provide dual beam power balance with variable exposure as set by serial downloaded data.

In accordance with the present invention, there is provided a raster imaging system for exposing a photoresponsive surface moving relative to the raster imaging system in a process direction, including a multi-beam laser diode scanner forming a plurality of rasters across said surface, in a direction transverse to the process direction, by reflecting and modulating a plurality of beams so as to direct the beams to the photoresponsive surface; a controller to control the power from the dual laser diode, said controller including, means to control, individually, the exposure level from each of the plurality of laser diodes by controlling the laser diode current, wherein the laser diode current is a sum of a plurality of individually controllable input currents, comprising a prebias current, a bias level current, a video bias level current, and an exposure level current In accordance with another aspect of the present invention, there is provided in a raster imaging system for exposing a photoresponsive surface moving relative to the raster imaging system in a process direction, a method for digitally controlling power from a laser diode comprising the steps of forming a plurality of rasters across said surface, in a direction transverse to the process direction, by reflecting and modulating a plurality of beams so as to direct the beams toward the photoresponsive surface; individually controlling the exposure power output by each of the multiple laser diodes by controlling the laser diode current, wherein the laser diode current is generated by summing individually controllable input currents, including a prebias current, a bias level current, a video bias level current, and an exposure level current.

One aspect of the invention is based on the discovery of techniques for controlling the bias and run power levels for multiple laser diodes so as to cause the beams to track on another in intensity. Such techniques can be implemented, for example, by a microcontroller or microprocessor to implement the feedback loop. The system described herein is advantageous because it is efficient and inexpensive compared to other approaches.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims

DESCRIPTION OF THE PREFERRED EMBODIMENT

Figure 1:
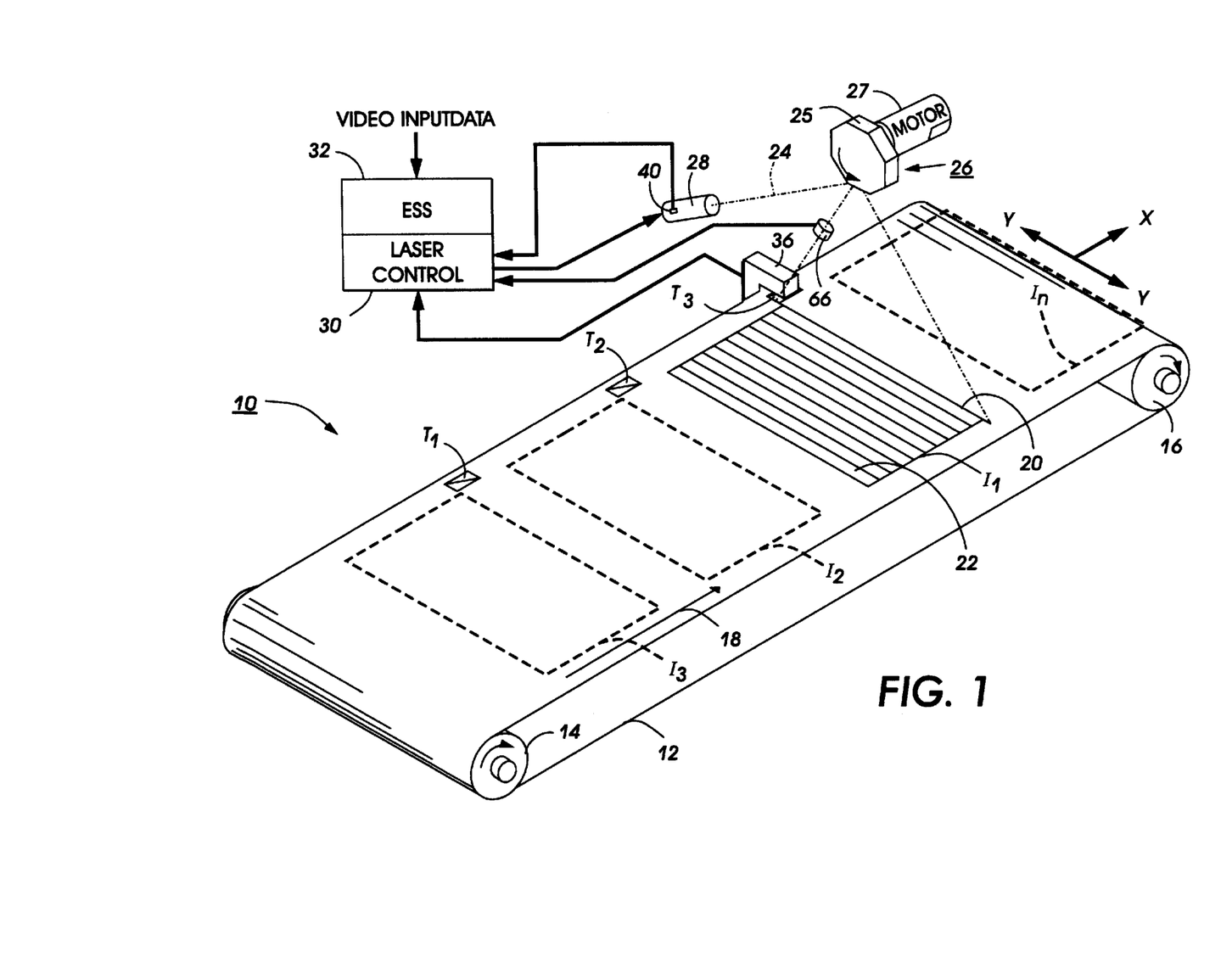
FIG. 1 illustrates a typical ROS printing system incorporating dual beam laser power control in accordance with the present invention.

FIG. 1 of the drawings schematically depicts an embodiment of the present invention incorporated in a multi-pass xerographic printing system and designated generally by reference numeral 10. The system 10 includes a photoresponsive (photoreceptor) belt entrained about guide rollers 14 and 16, at least one of which is driven to advance the belt 12 in a longitudinal direction of processing travel depicted by the arrow 18. The length of the belt 12 is designed to accept an integral number of spaced image areas $1_1$–$1_n$ represented by dashed line rectangles in FIG. 1. As each of the image areas $1_1$–$1_n$ reaches a transverse line of scan, represented at 20, it is progressively exposed on closely spaced transverse raster lines 22 shown with exaggerated longitudinal spacing on the image area 11 in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26 driven by motor 27 providing suitable feedback signals to control 30. The beam 24, illustrated in dotted lines is actually two beams, emitted by a laser device 28 such as a dual beam laser diode, operated by a laser drive module and power control forming part of a control processor generally designated by the reference numeral 30. The processor 30 includes other not shown circuit or logic modules such as a scanner drive command circuit, by which operation of motor 27 for rotating the polygon mirror 26 is controlled. A start of scan (SOS) detector, illustrated at 66 determines a start of scan reference point and also provides suitable feedback signals to control 30. SOS detector 66 may be implemented using an optical fiber to receive the laser beam at a SOS position and to transmit the beam to a photodetector spaced apart from the SOS position. In addition, a laser power sensor 40, also referred to as a back facet photodiode, senses a portion of the power of laser 28 to convey a power reading to control 30.

In the operation of the system 10, as thus far described, the control 30 responds to a video signal to expose each raster line 22 to a linear segment of the video signal image. In xerographic color systems, each image area $1_1$–$1_n$, is preferably exposed in the same manner for four successive exposures, one for each of the three primary colors (cyan, magenta, yellow) and black. In a multi-pass system such as the system 10, where only one raster output scanner or head is used, complete exposure of each image area requires four revolutions of the belt 12. It should also be noted that the present invention is equally applicable to other exposure systems (including single color or multi-color image-on-image systems).

The image areas $1_1$–$1_n$ are successively exposed on successive raster lines 22 as each raster line registers with a transverse scan line 20 as a result of longitudinal movement of the belt 12. It is to be noted that the length of the transverse scan line 20 in system 10 is longer than the transverse dimension of the image areas 1. Scan line length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scan line may be shifted in a transverse direction by control of the laser drive module and the transverse position of the exposed raster lines 22, and image areas $1_1$–$1_n$, shifted in relation to the belt 12.

Downstream from the exposure station, a development station (not shown) develops the latent image formed in the preceding image area. After the last color exposure, a fully developed color image is then transferred to an output sheet. An electronic Sub System (ESS) 32 contains the circuit and logic modules which respond to input video data signals and other control and timing signals, to drive the photoreceptor belt 17 synchronously with the image exposure and to control the rotation of the polygon by the motor. For further details, reference is made to U.S. Pat. Nos. 5,381,165 and 5,208,796 which are hereby incorporated by reference. As illustrated any suitable marker on the photoconductive surface or belt or any suitable hole such as T1, T2, and T3 provides a reference for each projected image on the belt surface.

In accordance with the present invention, a microcontroller (FIG. 2, 42) controls a dual beam laser diode with a total of 4 control loops in a shared, time slot multiplexed mode. There are two control loops per laser beam, a Bias and a Level Control loop. The same microcontroller is also employed within the Motor Polygon Assembly (MPA) speed control and other sub-system applications such as soft start ramping of lasers and diagnostics of laser failures with controlled ROS shutdowns. The microcontroller generates SAMPLE timing, logic sequencing of video overrides and Level control loop selections ONE ON, BEAM SELECT, HIGH, LOW in order to acquire the sampled power data for each of the four power control loops. A power sample is taken between each scan line during the rescan time (time between the end of one scan line to the beginning of the next scan line). This critical one sample per scan timing is generated by high speed capture and compare event timing also done by the microcontroller internally to implement an independent stand alone sub-system operation with simplified video interface that has been reduced to two channel video inputs and SOS pulse output.

In order to achieve the highest amount of resolution for both the control of the bias currents and the run level currents for a given number of control bits, the bias currents (not video modulated; DC) and the run currents (video modulated; AC) are each divided into two sources for each diode as shown, for example, in FIG. 6. A fixed predetermined prebias ($I_{ODC}$) is added to the D/A controlled bias ($I_{DC}$) for practical circuit design purposes which enables a higher resolution to the controlled bias amount. In a similar fashion, a level offset current ($I_{OAC}$) is added to the actual run level current when data is on such that the run level current is the sum of the level offset current and the A/D controlled run level current ($I_{AC}$). The run level offset is chosen to be at a current level that produces the minimum exposure light level expected to be used in the ROS. The use of a level offset current ($I_{OAC}$) assures the maximum resolution for the D/A converter producing the run level current. Also this run level offset can be used for the SOS detector since it will cause the laser diode to generate the same light output independent of the operating level of the laser during the writing cycle.

The Bias control tracks the threshold knee of the laser by adjusting the bias currents to produce a constant light output level regardless of the temperature of the laser diode. Maintaining this bias set point allows high speed modulation of the lasers by reducing the time it takes to go from video off to video on. This also minimizes droop of each diode and thermal crosstalk between dual lasers during writing by reducing short term differential heating effects; which are directly proportional to the size of the laser driving current differential between a data-off and a data-on state.

The Bias current is not switched On and Off with video modulation whereas the run Level current is switched On and OFF with video. The Bias is controlled indirectly by measuring the light output at a fixed point produced by adding a bias offset current to the total bias current. This brings the light output up to a measurable level above the threshold knee. This overcomes the problem of having insufficient diode output (light) for good feedback since the Bias is actually run below the threshold point without this offset current during the printing operation. This bias point adjustment takes place during the sample period during rescan and is preferably accomplished separately for each beam. In order to minimize the differential heating effects of one diode on another, both diodes are brought up their threshold points before any other adjustments are made. Controlling the light output during the data-off state, such that the diode remains at the same bias level, assures that the off exposure discharge of the photoreceptor is constant. Given that consistency, by setting the light level for each laser beam at a constant light level when data is on assures that the exposure discharge point, which is the combination discharge caused by the light from the bias and data set points, is consistent. This offers a large advantage over systems that do not track the bias level and only have constant light output since those systems will not deliver the same total exposure when the bias exposure point is changing. By having these two points controlled in the ROS control system of the present invention, it eliminates "hunting" by process controls; where the process controls are setting the exposure of the ROS by setting the level based upon the amount of discharge it creates during the data on cycle. Without constant light output at bias, the discharge caused by the level exposure would drift thus setting up conditions where the process controls could hunt.

The Level control compensates for change in light output due to changes in slope efficiency with temperature. Unlike the Bias control that regulates the output power to an indirect fixed power point, the Level control directly regulates the exposure output to a variable reference (e.g., one byte) set point that implements the ability to change exposure. This measurement of each beam is done sequentially since there is only one detector contained within the dual diode. These measurements are made using the microcontroller using a time-multiplexed method. This is done in sequence along with the bias adjustments in such a way as to minimize the time between all measurements and thus compensate for the adjacent heating effects.

The result of the indirect regulation of the Bias at a fixed power point also makes available a constant exposure level that is used during SOS detection. This provides advantages in two ways. It enables use of much lower cost SOS detector circuits that would otherwise need to be insensitive to change in laser power over the full exposure range during detection. It also improves the positional repeatability of SOS detector in sensing the beam which becomes very important when applied to Image on Image (IOI) and micron level color registration especially in a multi-pass system where exposure is changed by large steps when switching colors.

Using a dual beam laser also leads to possible repeatability errors in SOS detection if exposing the SOS with both beams or worse yet alternating between beams. This system implements exposing the SOS with only one beam at the fixed low level provided by the indirect bias control.

Figure 2:
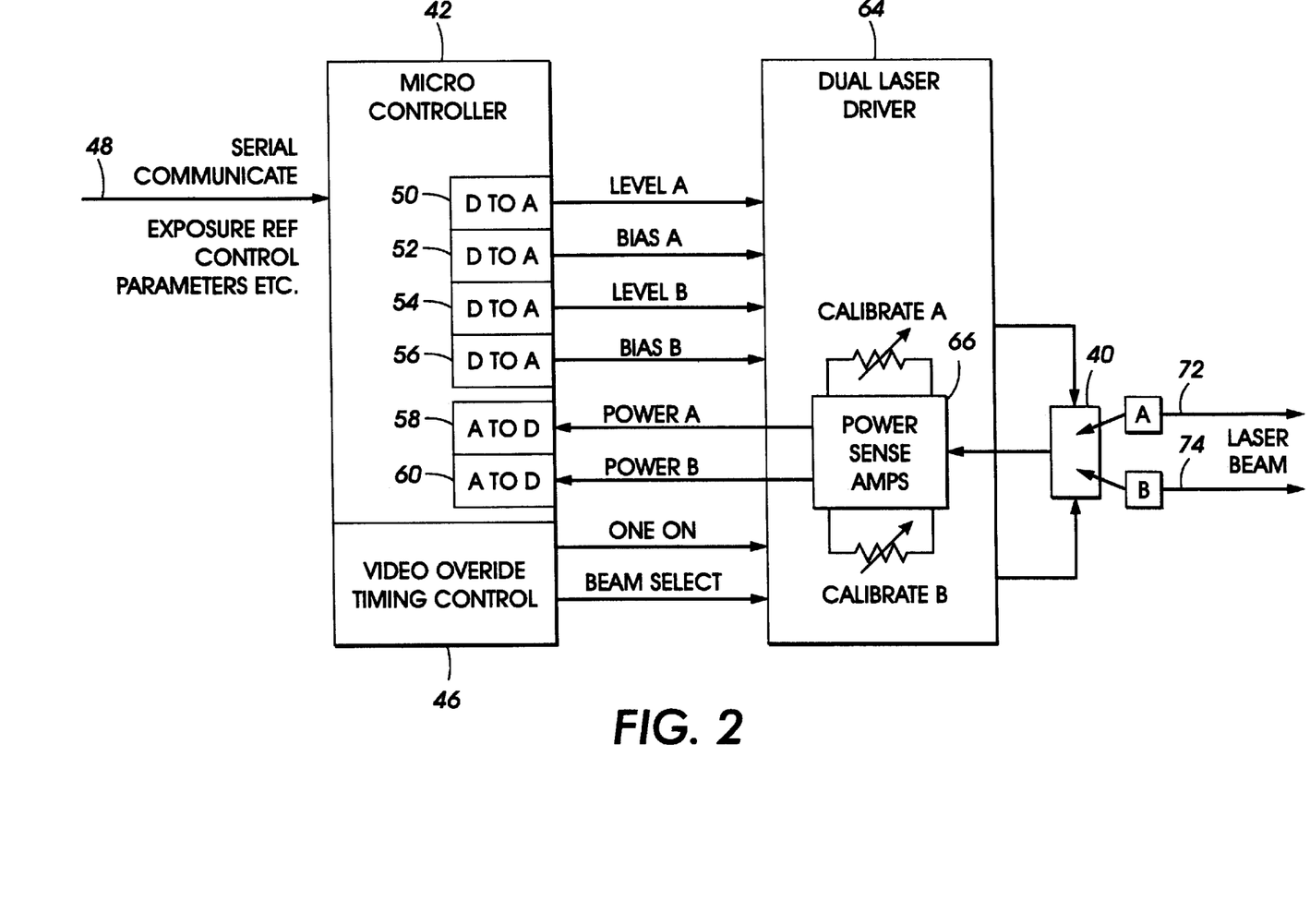
FIG. 2 is a general block diagram of a microprocessor two point power control for a dual laser diode in accordance with the present invention.
Figure 8:
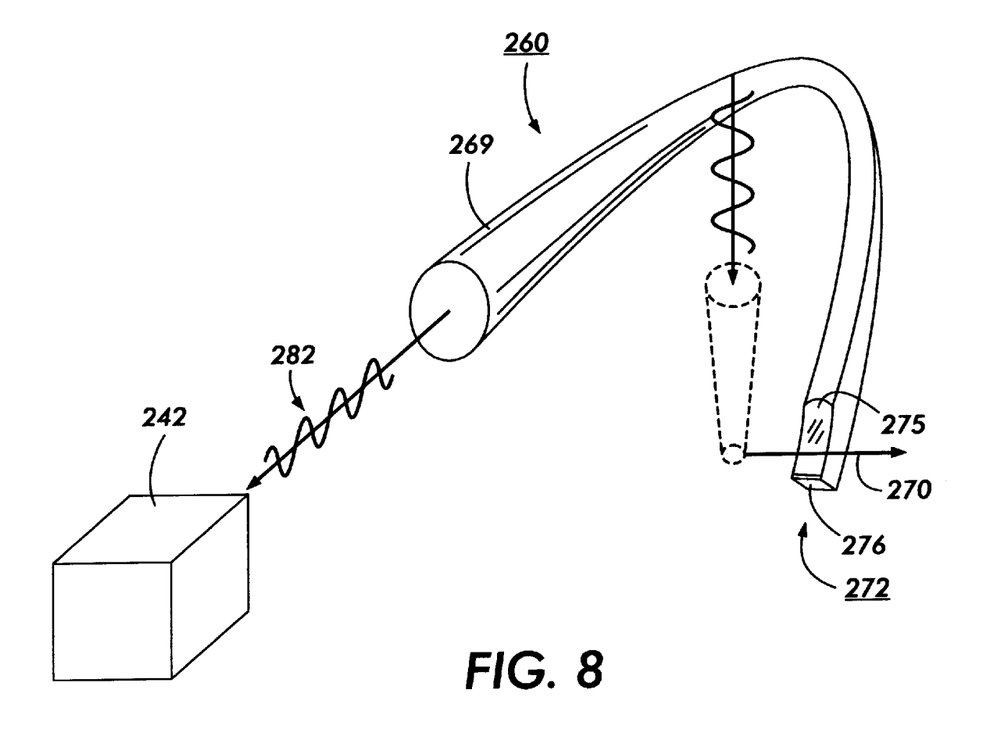
FIG. 8 is an illustration of a low-cost start-of-scan detector that is preferably employed in an embodiment of the present invention.

As depicted in FIG. 8, and as alternatives are taught more specifically in U.S. Pat. No. 5,508,513 to Genovese, issued Apr. 16, 1996, and hereby incorporated by reference, the low-cost SOS detector 260 preferably consists of a plastic fiber(s) coupled to an inexpensive pin diode(s) 242 (e.g., Motorola). Prior art designs using optical fiber coupled SOS detectors did not maintain a consistent light level when the beam passed over them such that they produced different results as to beam positions with different light levels. While this may be acceptable for lower quality output systems (e.g. home market), it does not meet the requirements of the mid- and high-volume markets and would never meet the registration requirements of a multiple image (e.g., multipass color) system. The rigorous registration requirement is one reason that many laser-based printing products use a split detector arrangement (split detectors are relatively insensitive to light level). However, split detectors are relatively expensive and require placement in the beam path along with their associated electronics. Thus a separate circuit board and wiring harness are required for split SOS detectors. On the other hand, the low-cost fiber-coupled detector may be employed in a manner allowing all the associated electronics to be mounted on the laser diode driver board (FIG. 2; 64). By controlling the light output falling on the fiber SOS detector at a constant level during the sensing period, this simple arrangement was made acceptable for high-resolution systems.

With respect to FIG. 2, there is shown a general block diagram of a microprocessor based dual beam two point laser power control in accordance with the present invention, in particular, microcontroller 42 receives serial communications designated at 48 such as laser exposure references and control parameters. Microcontroller 42 also includes suitable digital to analog converters illustrated at 50, 52, 54, and 56 providing control signals to dual laser driver 64 appropriate to level and bias control loops for beams A and B of a dual beam laser. In addition, microcontroller 42 includes analog to digital converters 58 and 60 receiving power A and power B sense signals from power sense amplifier 66. Also, microcontroller provides suitable video override and timing control signals illustrated at 46.

Dual laser driver 64 includes power sense amplifier 66 conveying signals from power sensor 40 to microcontroller 42. The power sensor 40 alternately senses a portion of the laser output power for beam A shown at 72 and beam B shown at 74 to provide the appropriate measure of beam power to microcontroller 42, in turn providing the appropriate level and bias control adjustments to dual driver laser 64.

Figure 3:
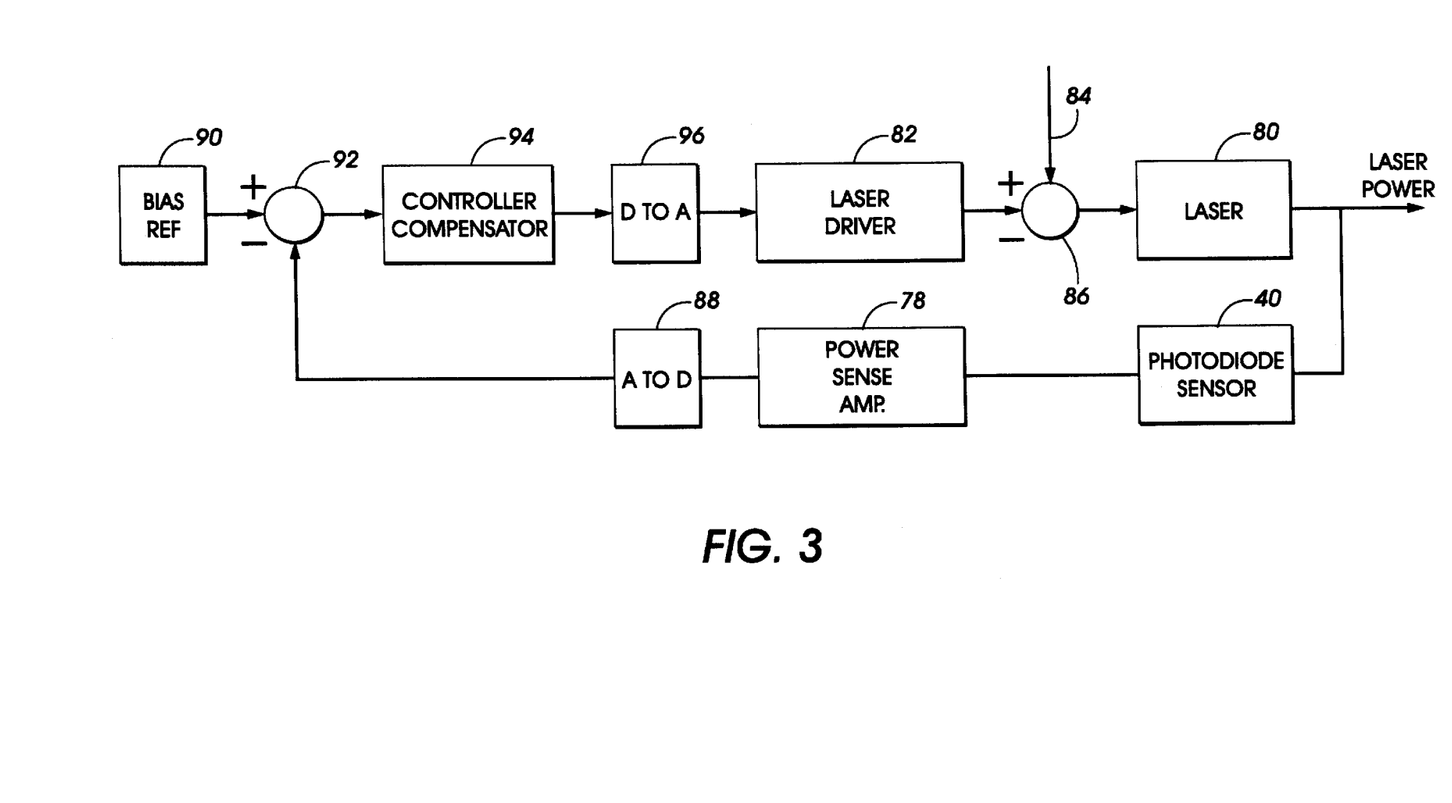
FIGS. 3 and 4 illustrate two concurrent control loops for Exposure On and Exposure Off of the dual laser diode of FIG. 2 in accordance with the present invention.
Figure 4:
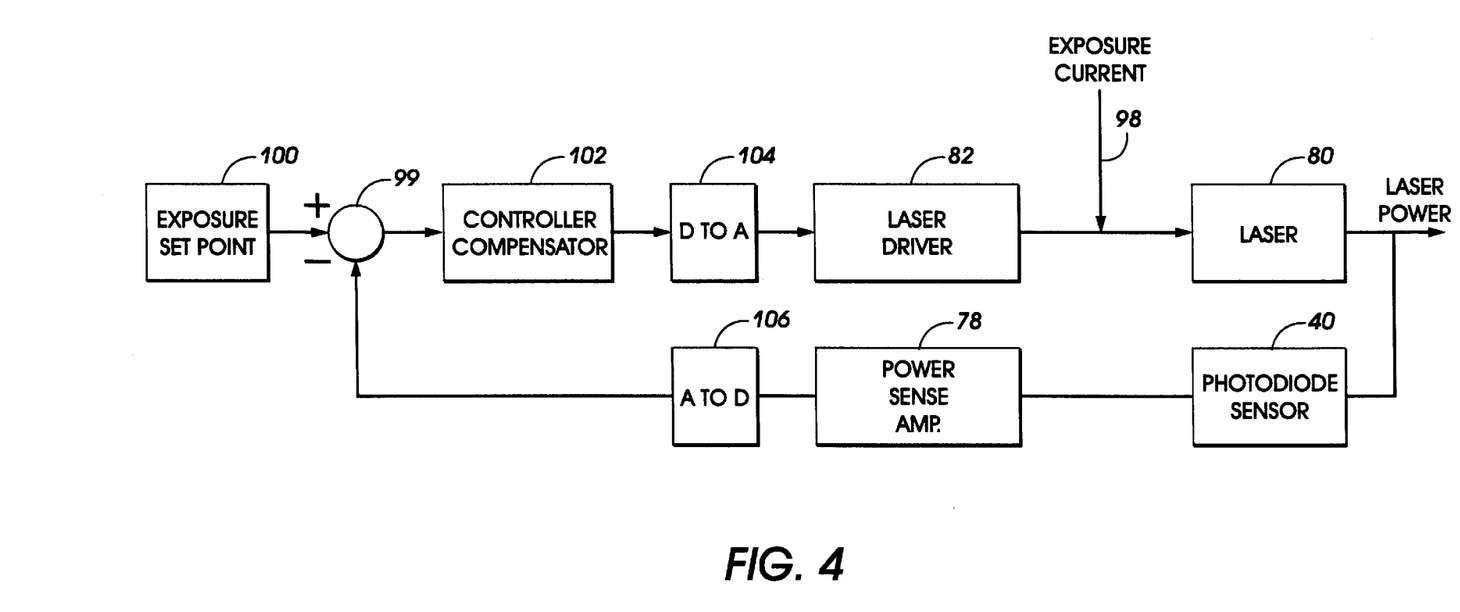

FIG. 3 and 4 illustrate the bias and level control loops for a given laser beam With reference to FIG. 3, for bias control laser 80 provides an output beam having a given power. A portion of the output beam, in one embodiment approximately one percent of the output beam, is sensed by photo diode sensor 40 to provide a measure of the output power of the beam. Photo diode sensor 40 conveys a signal representing output power to power sense amplifier 78, in turn providing a signal to analog to digital converter 88. A summing node 92 receives the output of the analog to digital converter 88 as well as a bias reference 90 to provide an error signal to controller compensator 94. The bias reference 90 is an indirect fixed reference related to the OFF exposure of the laser beam. A digital to analog converter 96 converts the signal from the controller compensator 94 to control laser driver 82, a voltage control current source. The output of the laser driver 82, is conveyed to laser 80 with a level low fixed offset current 84 switched in as illustrated at node 86 to indirectly sense bias. This is the bias or OFF exposure control loop.

With reference to FIG. 4, there is shown the ON exposure or level control loop. In particular, photodiode sensor 40 provides a measure of the laser power output from laser 80 conveyed to power sense amplifier 78, to analog to digital converter 106 to summing node 99. A second input to summing node 99 is the exposure set point reference illustrated at 100. Controller compensator 102 via digital to analog converter 104 provides a suitable signal to laser driver 82. The output voltage of the laser driver 82 is responsive to digital to analog converter 104 and exposure current illustrated at 98 to drive laser 80. It should be noted that in both FIGS. 3 and 4 the digital to analog and analog to digital converters, the controller compensators, the summing nodes, and bias control and level control reference signals are preferably included in microcontroller software.

The laser power control states are generally described as follows: In particular, the laser OFF standby state is shown at 210, and the laser ON condition initiates a soft start ramp time out shown at 212 with a ramp time out fault illustrated at 214. A ramp complete condition results in a bias control converge state 216 with a bias converge time out fault shown at 218. The bias ready condition results in a level control converge state 220 with a level control time out fault shown at 222. And finally, the level and biased ready condition results in the maintain laser ready to print state shown at 224 with a maintain ready fault shown at 226, and a laser OFF resulting in a return to the laser off standby state 210.

Figure 5:
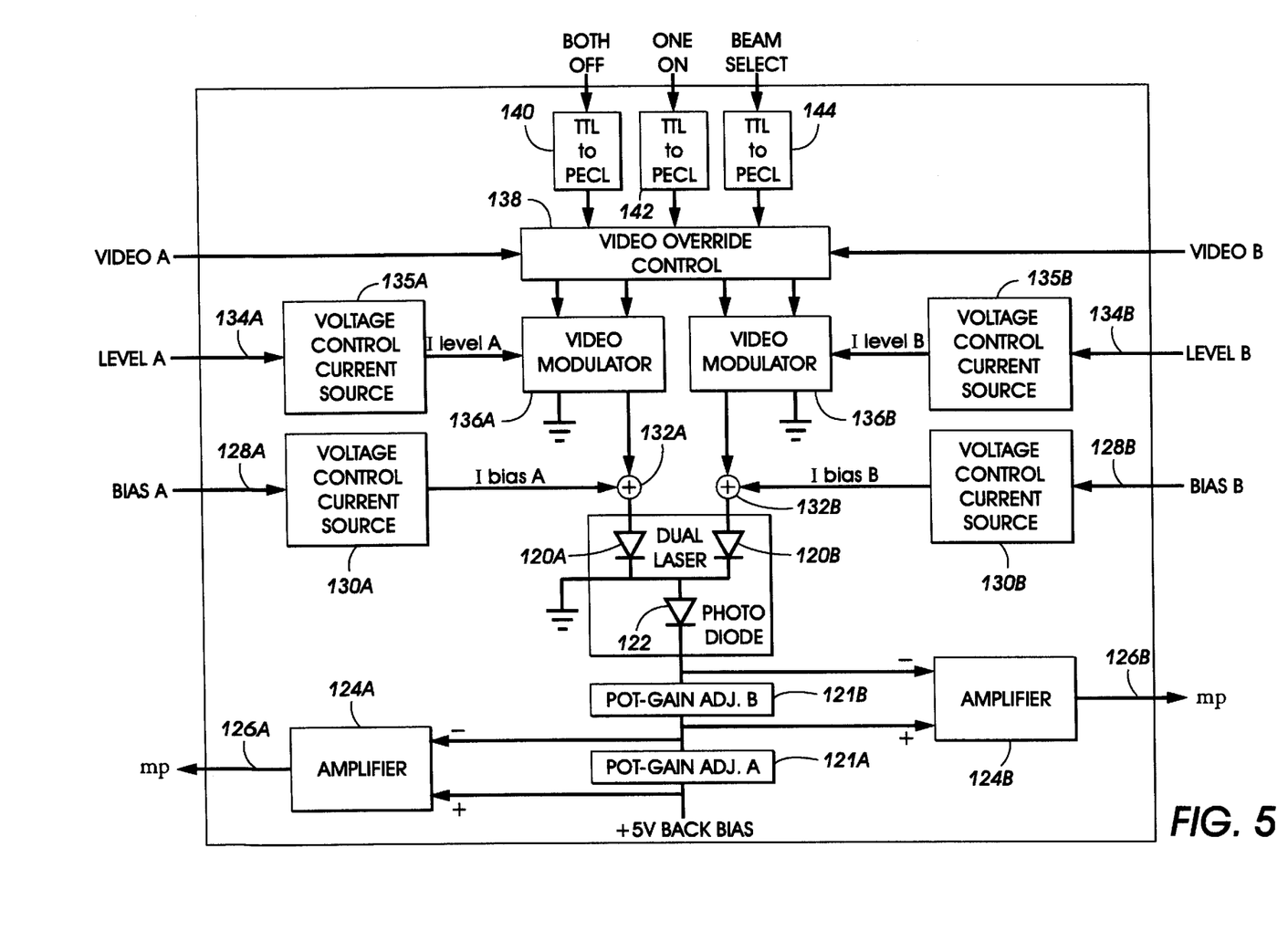
FIG. 5 is a diagram of the laser Driver/Amplifier, Laser Diode, Feedback Photodiode, and Back Facet Amplifier in accordance with the present invention.

FIG. 5 illustrates the laser driver/amplifier, laser diode, feedback photodiode, and back facet amplifier portion of the control loops for dual lasers 120A and 120B with gain adjusts 121A and 121B. Photodiode 122 alternately samples the power from lasers 120A and 120B for feedback to a microprocessor or a digital controller on lines 126A and 126B through amplifiers 124A and 124B. Summing junctions 132A and 132B combine the adjusted bias voltages from the Bias controls 130A and 130B via lines 128A and 128B with the video modulator signals 136A, 136B to drive the lasers 120A and 120B. Level A and level B signals 134A, 134B to voltage control current sources 135A and 135B provide input to the video modulators 136A and 136B along with the video signals video A and video B from the video override control 138, in turn responsive to the override selection circuitry 140, 142, and 144.

Figure 6:
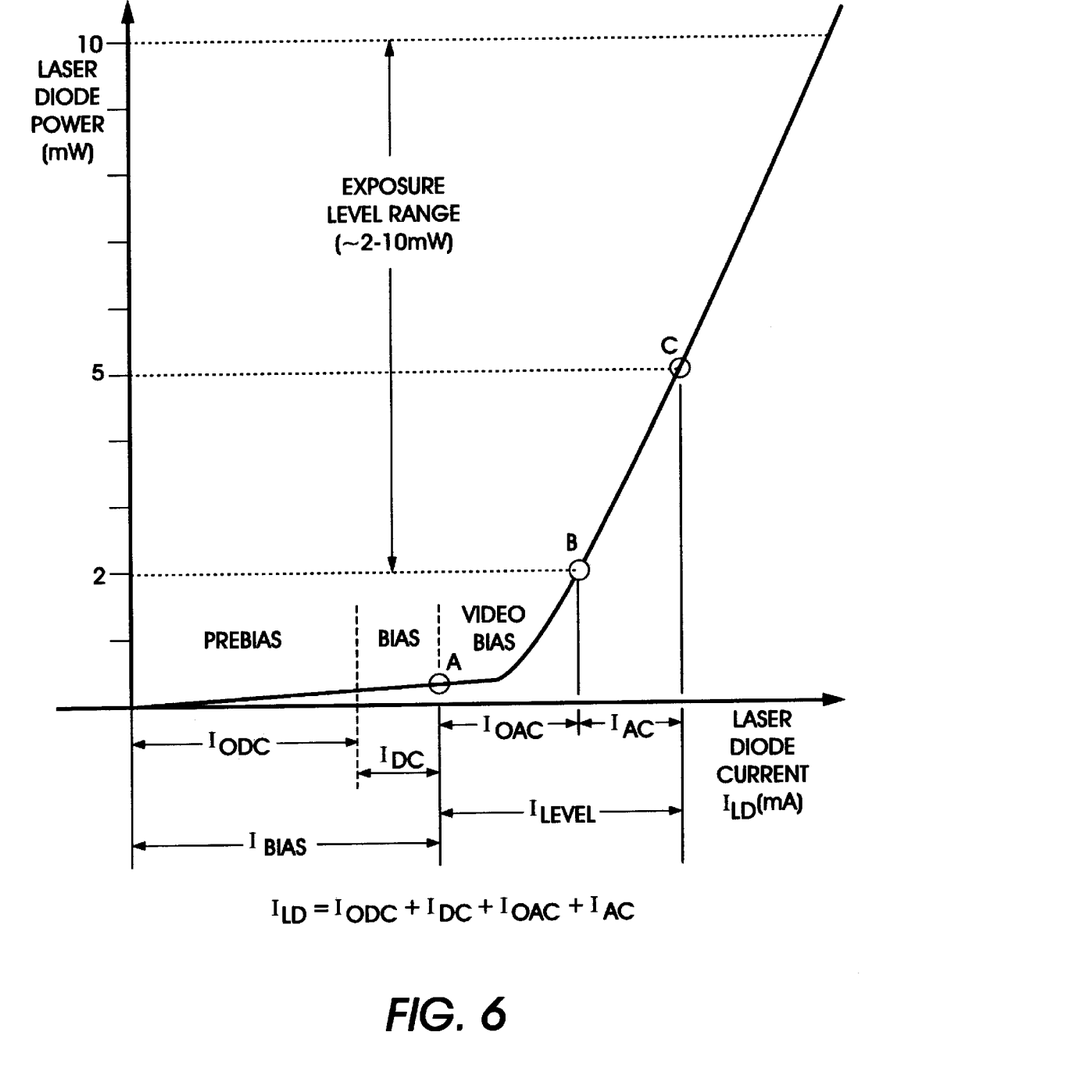
FIG. 6 illustrates a laser diode characteristic light intensity—driver current (LI) curve showing current components in accordance with the present invention.

FIG. 6, as previously described, illustrates a laser diode IL characteristic curve for a laser diode used in accordance with the present invention; the laser diode output power in milliwatts as a function of the laser diode driving current in milliamps. Point A on the curve, the DC bias control level, illustrates the level of bias current at a video off or background level. Point B, level control, illustrates the sum of the DC Bias control level and an AC bias current reference point, that is, a fixed power level having some controlled exposure which is also used for start-of-scan detector exposure. Point B is a point where there is a predetermined output level of the laser diode, yet sufficient to enable detection by the SOS detector previously described. $I_{OAC}$ is a biasing current added to the background bias only when exposure is desired. As previously characterized, the $I_{OAC}$ bias is employed to increase the resolution of the variable current $I_{AC}$, and to control power for the diode exposure of the photoresponsive surface (photoconductor) at Point C on the curve represents a power level for video on.

As illustrated in FIG. 6, the prebias current $I_{ODC}$, preferably in the range of 0–25 mA, is added to the D/A controlled bias ($I_{DC}$), in the range of 0–25 mA to control the background point at a level slightly below the laze threshold or knee of the IL curve. Similarly, the level offset or video bias current ($I_{OAC}$) is added to the actual run level current when data is on such that the run level current ($I_{LEVEL}$) is the sum of the level offset current and the A/D controlled run level current ($I_{AC}$) The level offset current is preferably in the range of 0–15 mA and is a level chosen to produce the minimum exposure light level expected to be used in the ROS (a level suitable for detection by the SOS detector). Like the prebias current, use of a level offset current ($I_{OAC}$) assures the maximum resolution for the D/A converter controlling the run level current ($I_{LEVEL}$) over a preferred range of 0–40 mA and in turn the total laser diode current ($I_{LD}$) to control the laser diode output power over a suitable range (e.g., approx. 2–10 mW).

The bias current is a variable current controlled by a bias control loop which has a fixed reference. This bias defines the OFF or background point to reside slightly below the lazing threshold knee. The off exposure is controlled by measuring the laser power resulting from both bias current and level low current. Level current is a current that is one of two sources selected by a HIGH, LOW signal on an analog multiplexer depending upon whether bias or level is being controlled. Level low current is a fixed back off current riding on top of BIAS current that implements the indirect measure of the OFF exposure point. High current is a variable current controlled by the LEVEL control loop which has a variable reference that is used to set to ON exposure point.

Figure 7:
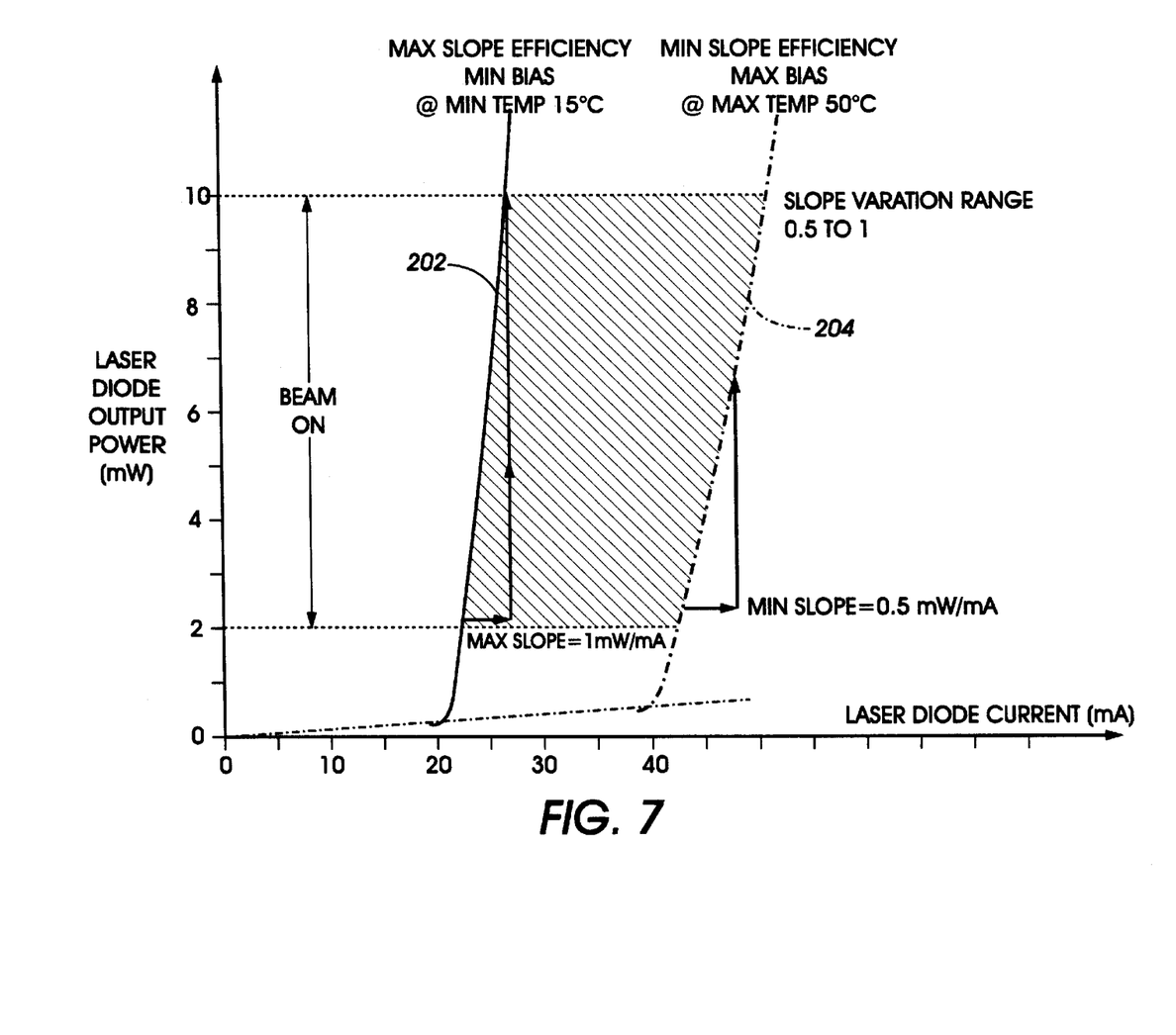
FIG. 7 illustrates a laser diode characteristic curve defining a control range envelope in accordance with the present invention.

FIG. 7 illustrates a typical laser diode characteristic curve defining a control range. Again, laser diode output power in milliwatts is plotted versus laser diode current in milliamps. Curve 202 illustrates a maximum slope efficiency with minimum bias current at a temperature of about 15° centigrade. Curve 204 illustrates a minimum slope efficiency at maximum bias current at a maximum temperature of about 50° centigrade. A threshold knee range is shown between twenty and forty milliamps with a bias control range at 0 to 40 milliamps.

FIG. 8 is an illustration of the low-cost start-of-scan detector as employed for an aspect of the present invention. Although various alternative configurations are possible, detector 260 preferably comprises fiber(s) 269 having a light entrance end 272. The entrance end includes a flattened entrance window 275 and an angled reflection surface 276. A scan exposure beam from a laser diode, scanning in direction 270, enters through the entrance window and is reflected from the angled reflection surface and so as to direct the light beam axially along the length of the fiber. Output 282 is preferably optically coupled to a photodetectors 242, wherein the photodetector is preferably a pin diode sensitive to the level of light emitted from the multiple laser diode when in an On state.

In recapitulation, the present invention is a method and apparatus for the control of the exposure level for a multiple laser diode system. In particular, the system employs predetermined, controllable biasing currents to increase the resolution of the exposure current and thereby accurately control the output power of each of the multiple laser diodes, and to provide a fixed exposure level that is detectable by a low-cost start-of-scan detector.

It is, therefore, apparent that there has been provided, in accordance with the present invention, a method and apparatus for control of the exposure level in a multiple laser diode system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A raster imaging system for exposing a photoresponsive surface moving relative to the raster imaging system in a process direction, including:
   a multi-beam laser diode scanner forming a plurality of rasters across said surface, in a direction transverse to the process direction, by reflecting and modulating a plurality of beams so as to direct the beams to the photoresponsive surface;
   a controller to control the power from the multi-beam laser diode, said controller including, means to control, individually, an exposure level from each of a plurality of laser diodes by controlling the laser diode current,
   wherein a laser diode current is a sum of a plurality of individually controllable input currents, at least comprising:
   a prebias current,
   a bias level current and,
   an exposure level current,
   wherein the sum of the prebias current and the bias level current for one of a plurality of laser diodes is less than the current necessary to cause the respective laser diode to begin to laze.

2. The raster imaging system of claim 1, wherein the prebias current is greater than the bias level current.

3. The raster imaging system of claim 1, further including a start-of-scan detector for detecting the beginning of a raster and providing a start-of-scan (SOS) signal representing the detection, said start-of-scan detector comprising a fiber-coupled detector, wherein the detector is spaced apart from a start-of-scan detection position.

4. The raster imaging system of claim 3 wherein the laser diode current is controlled so as to produce a constant exposure power during start-of-scan detection.

5. An imaging system for forming multiple superimposed image exposure frames on a photoconductive member moving in a process direction including:
   a multiple laser diode scanner forming a plurality of scan lines in a transverse direction across a width of the member by reflecting modulated beams from a plurality of facets of a rotating polygon;
   means for detecting the beginning of a scan line as a modulated beam traverses a start-of-scan position and providing a start of scan (SOS) signal representing the detection, said detector comprising a fiber-coupled detector, wherein the detector is spaced apart from the start-of-scan detection position and wherein the light energy from the modulated beam is transmitted along the fiber, from the start-of-scan position to a photodetector; and
   a controller to control the output power from each of a plurality of multiple laser diodes, said controller including, means to control, individually, an exposure level from each of the plurality of laser diodes by controlling a laser diode current,
   wherein the laser diode current is a sum of a plurality of individually controllable input currents, at least comprising
   a prebias current,
   a bias level current, and
   an exposure level current,
   wherein the sum of the prebias current and the bias level current for one of a plurality of laser diodes is less than the current necessary to cause the respective laser diode to begin to laze.

6. The raster imaging system of claim 5, wherein the prebias current is greater than the bias level current.

7. The raster imaging system of claim 5, further including a start-of-scan detector for detecting the beginning of a raster and providing a start-of-scan (SOS) signal representing the detection, said start-of-scan detector comprising a fiber-coupled detector including an entrance end for receiving the modulated beam and an output end coupled to a pin diode, said entrance end positioned at the start-of-scan position adjacent the photoconductive member and said output end and pin diode spaced apart from the start-of-scan detection position.

8. The raster imaging system of claim 7 wherein the laser diode current is controlled so as to produce a constant exposure power during start-of-scan detection.

9. In a raster imaging system for exposing a photoresponsive surface moving relative to the raster imaging system in a process direction, a method for digitally controlling power from a laser diode comprising the steps of:
   forming a plurality of rasters across said surface, in a direction transverse to the process direction, by reflecting and modulating a plurality of beams so as to direct the beams toward the photoresponsive surface;

individually controlling the exposure power output by each of a plurality of multiple laser diodes by controlling a laser diode current applied thereto, wherein the laser diode current is generated by summing individually controllable input currents, at least including a prebias current, a bias level current, and an exposure level current, wherein the sum of the prebias current and the bias level current for one of a plurality of laser diodes is less than the current necessary to cause the respective laser diode to begin to laze.

10. The method of claim 9, wherein the prebias current is controlled so as to be greater than the bias level current.

* * * * *